(12) United States Patent
Davenport et al.

(10) Patent No.: US 6,626,356 B2
(45) Date of Patent: Sep. 30, 2003

(54) MULTI-USE CREDIT CARD FOR FINANCIAL TRANSACTIONS AND VEHICLE CONFIGURATION

(75) Inventors: David Michael Davenport, Niskayuna, NY (US); John Erik Hershey, Ballston Lake, NY (US)

(73) Assignee: General Electric Company, Erie, PA (US)

( * ) Notice: Subject to any disclaimer, the term of this patent is extended or adjusted under 35 U.S.C. 154(b) by 206 days.

(21) Appl. No.: 09/880,471

(22) Filed: Jun. 14, 2001

(65) Prior Publication Data
US 2002/0190118 A1 Dec. 19, 2002

(51) Int. Cl.⁷ .................. G06K 17/00; G06K 5/00
(52) U.S. Cl. ............. 235/375; 235/384; 235/380
(58) Field of Search .................. 235/384, 385, 235/383, 382, 382.5, 380, 375

(56) References Cited
U.S. PATENT DOCUMENTS 6,289,315 B1 * 9/2001 Calvi .......................... 705/1
6,493,685 B1 * 12/2002 Ensel et al. ................. 705/40
6,512,921 B1 * 1/2003 Hadinger .................... 455/431
2002/0190118 A1 * 12/2002 Davenport et al. ......... 235/375
2003/0034873 A1 * 2/2003 Chase et al. ................ 340/5.2

* cited by examiner

Primary Examiner—Thien M. Le
(74) Attorney, Agent, or Firm—Carl A. Rowold, Esquire; Terry M. Sanks, Esquire; Beusse Brownlee Bowdoin Wolter, P.A.

(57) ABSTRACT

A credit card system and method for configuring a vehicle specific to a user and for transacting financial transactions, the system comprising a User Preference and Information Database containing information specific to said user for configuring a specific vehicle, a credit card capable of storing financial transaction information and information to access said User Preference Database, a credit card data receptacle located in said vehicle, a global communication network, a User Transaction History Database containing information about said user's prior transactions, a display monitor located in said vehicle, and a point of sale where said credit card is used for a financial transaction.

32 Claims, 4 Drawing Sheets

MULTI-USE CREDIT CARD FOR FINANCIAL TRANSACTIONS AND VEHICLE CONFIGURATION

BACKGROUND OF THE INVENTION

The present invention relates to a credit card and more specifically to a credit card system and method that allows a user to use a credit card for a financial transaction and to customize a vehicle specific for a user of the credit card.

Credit cards and bank debit cards currently exist for financial transactions. These cards are becoming so well used that almost all places of business accept credit cards and bank debit cards for payment. For example, instead of paying inside of a gas station or seeking out a gas attendant to pay for gas, credit cards and debit cards are used at a gas pump for self-service gasoline purchases. These cards are also used to make phone calls from pay phones and while in-flight on an airplane. To simplify purchases at stores, self-service devices are now installed at check-out registers. To assist a user in obtaining cash, Automatic Teller Machines (ATMs) now allow users to deposit, withdraw, and transfer funds to and from bank accounts without interacting with an employee of a bank.

Many of these cards include a magnetic strip, attached to the back of the credit card, which contains information about a credit card owner's account. During a financial transaction, the magnetic strip is passed through a magnetic card reader so that the information contained on the magnetic strip can be read. Usually, when a credit card is used, the information from the magnetic strip is transmitted, usually over telephone lines, to a credit card company or another authorization service to obtain authorization for a particular purchase.

For individuals who use generally complex equipment, such as mobile assets including on-road or off-road vehicles, ships, airplanes, railroad locomotives, trucks, and other forms of complex equipment including industrial equipment, consumer appliance equipment, medical imaging equipment, equipment used in industrial processes, telecommunications, aerospace applications, power generation, etc., where a number of the complex equipments are available, such as a vehicle which is part of a fleet of vehicles, for example a fleet of trucks, buses, or trains, and the individual is not guaranteed to always use the same piece of complex equipment, the individual has to adjust settings on the specific equipment to the individual's specifications.

For example, when traveling, instead of traveling with a significant amount of money, an individual will use a credit card to purchase food, lodging, and other items. When such individuals utilize assorted vehicles within a fleet of vehicles, the need to make purchases is juxtaposed with the desire to configure the vehicle to the user's liking. Because the vehicle used by a specific user is part of a fleet, the user may not use the same vehicle every time. Thus, at a minimum, the user must adjust the climate controls, seating position, steering wheel position, preprogrammed radio stations and other adjustable features to the user's specific liking.

SUMMARY OF THE INVENTION

Towards this end, a user of a credit card or debit card would benefit from a card which in addition is integral in financial transaction, is also able to be used to customize equipment to a user's specifications. Thus this invention discloses a credit card system for use by a user for conducting financial transactions and configuring features in a vehicle specific to said user. The credit card system comprises a credit card with storage space capable of storing information needed for a financial transaction and information needed to configure a vehicle specific to a user of the credit card, with a credit card data receptacle located in the vehicle. The system also has a User Preference Database, a global communication network, and respective network transceivers. The network transceivers are used for communicating over the global communication network, where they are connected to the credit card data receptacle and the User Preference Database.

This invention also discloses a method for configuring a complex equipment specific to a user with a credit card. The method has a User Preference Database. The method provides for entering a credit card into a receptacle connected to the complex equipment. The method further allows for the credit card to retrieve complex equipment setting data specific to the user from the User Preference Database. The method provides for configuring the complex equipment based on the data received.

BRIEF DESCRIPTION OF THE DRAWINGS

The present invention can be more easily understood and the further advantages and uses thereof more readily apparent, when considered in view of the description of various exemplary embodiments and the following figures in which.

DETAILED DESCRIPTION

Figure 1:
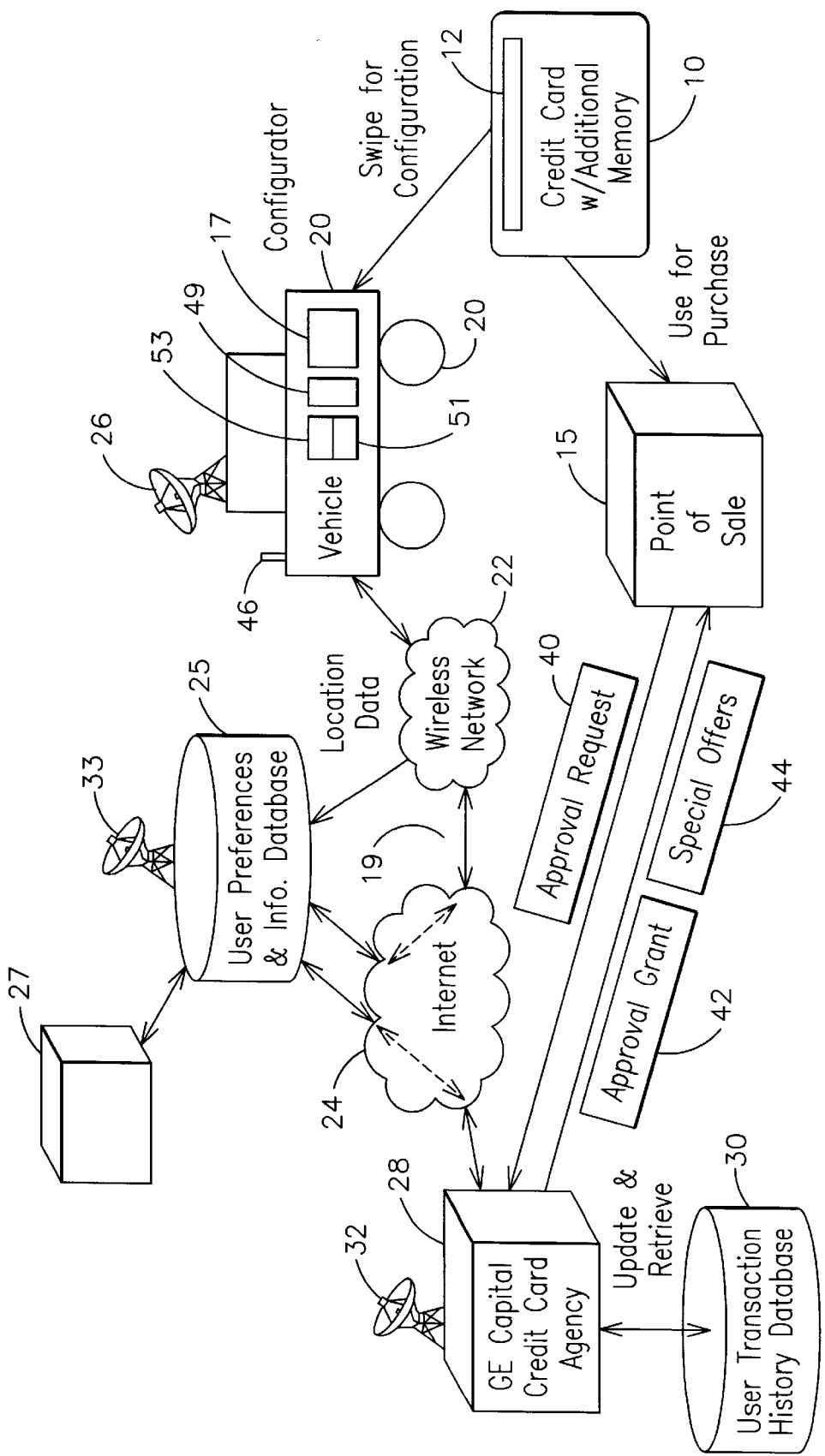
FIG. 1 is an exemplary illustration of components needed for the invention and communication connections between the components.

FIG. 1 is an exemplary illustration of all of the components of the invention including communication connections between the components. A credit card 10 generally has one magnetic strip 12 fixed to the back of the credit card 10. In a preferred embodiment, a credit card 10 includes a wider magnetic strip or a second magnetic strip, neither of which are shown, on the back on which various data is recorded. In another preferred embodiment, not shown, an Integrated Circuit chip is embedded within the card to provide a storage component for storing various types of data. Physically, the storage component may be a single unit, but functionally is segmented into a plurality of storage components. In another embodiment, each storage component may be individual storage units.

As further illustrated in FIG. 1, the credit card 10 can be used either for a purchase at a point of sale 15, or can be inserted in a receptacle or configurator 17 within a vehicle 20. Though a vehicle 20 is the piece of equipment referenced in explaining all of the drawings, the vehicle 20 can be any complex equipment, such as mobile assets including on-road or off-road vehicles, ships, airplanes, railroad locomotives, trucks, buses and mobile industrial equipment. Ones skilled in the art will also appreciate that this invention can also be used with other forms of complex equipment including other industrial equipment, consumer appliance equipment, medical imaging equipment, equipment used in industrial processes, telecommunications, aerospace applications, power generation, etc.

In a preferred embodiment the credit card 10 contains a magnetic strip 12 and the receptacle 17 can read information contained on the magnetic strip 12. In another embodiment the information is contained in another readable media, not shown, and the receptacle 17 can read the information contained on this media. Once inserted within the credit card receptacle 17 or configurator, the vehicle 20, using a wireless network 22, will connect to a communication network 24, such as the Internet, and then connect to the User Preferences and Information Database, or User Preference Database 25. To make the connections a transceiver 26 is part of the vehicle 20. In another embodiment the complete network is wireless or is some other global communication network 19. Using the wireless connection 22 and Internet connection 24, the vehicle 20 will also be able to connect to a facility 28, such as a Credit Card Agency, which maintains a User Transaction History Database 30. This facility 28, in one embodiment, can house both the User Transaction History Database 30 and the User Preferences and Information Database 25. In another embodiment a separate facility 27 houses the User Preference Database 25. A transceiver 32, 33 capable of communicating with the global communication network 19 is located at the User Transaction History Database 30 and the User Preference Database 25. Thus, when the credit card 10 is used at a point of sale 15, the point of sale 15 would communicate 40 with the facility 28 maintaining the User Transaction History Database 30 to seek approval and then transmit 42 to the point of sale 15 that approval of the sale was granted. In a preferred embodiment, based on an agreement with the Credit Card Agency 28 and a point of sale 15, special offers, in the way of coupons, incentives, deals, or rebates 44 can be transmitted to the point of sale 15 for a user to use.

Figure 6:
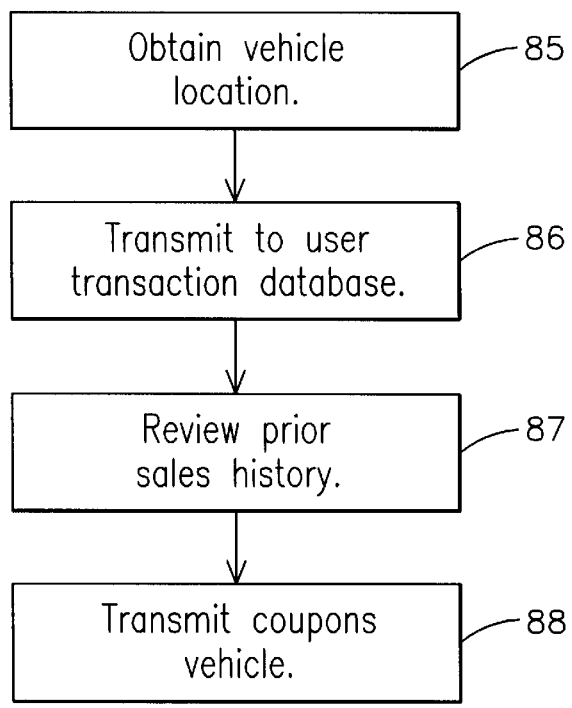
FIG. 6 is a flow chart illustrating a preferred embodiment of selecting a coupon.

Also illustrated in FIG. 1 and in FIG. 6 is the ability to transmit and store location data about the vehicle 20 to the User Preference Database 25. The Credit Card Agency 28 is then able to obtain the location of the vehicle 20 via the global communication network 19, or some other data sharing mechanism, from the User Preference Database 25. Based on the location of the vehicle 20, the Credit Card Agency 28 transmits special offers, in the way of coupons, incentives, deals, or rebates 44 to the point of sale 15 for the user based on the user's prior transactions contained in the User Transaction History Database 30 and current geographic location and proximity to related goods or services. Thus, FIG. 6 illustrates first obtaining a location of the vehicle, step 85. The location is sent to the User Transaction History Database 30, step 86. This information can be sent directly from the vehicle or through the User Preference Database 25. The Credit Card Agency 28, using the User Transactions History Database 30 will review prior sale history of the user, step 87. Based on prior sales and the location of the vehicle, a coupon will be transmitted to the vehicle, step 88.

Figure 2:
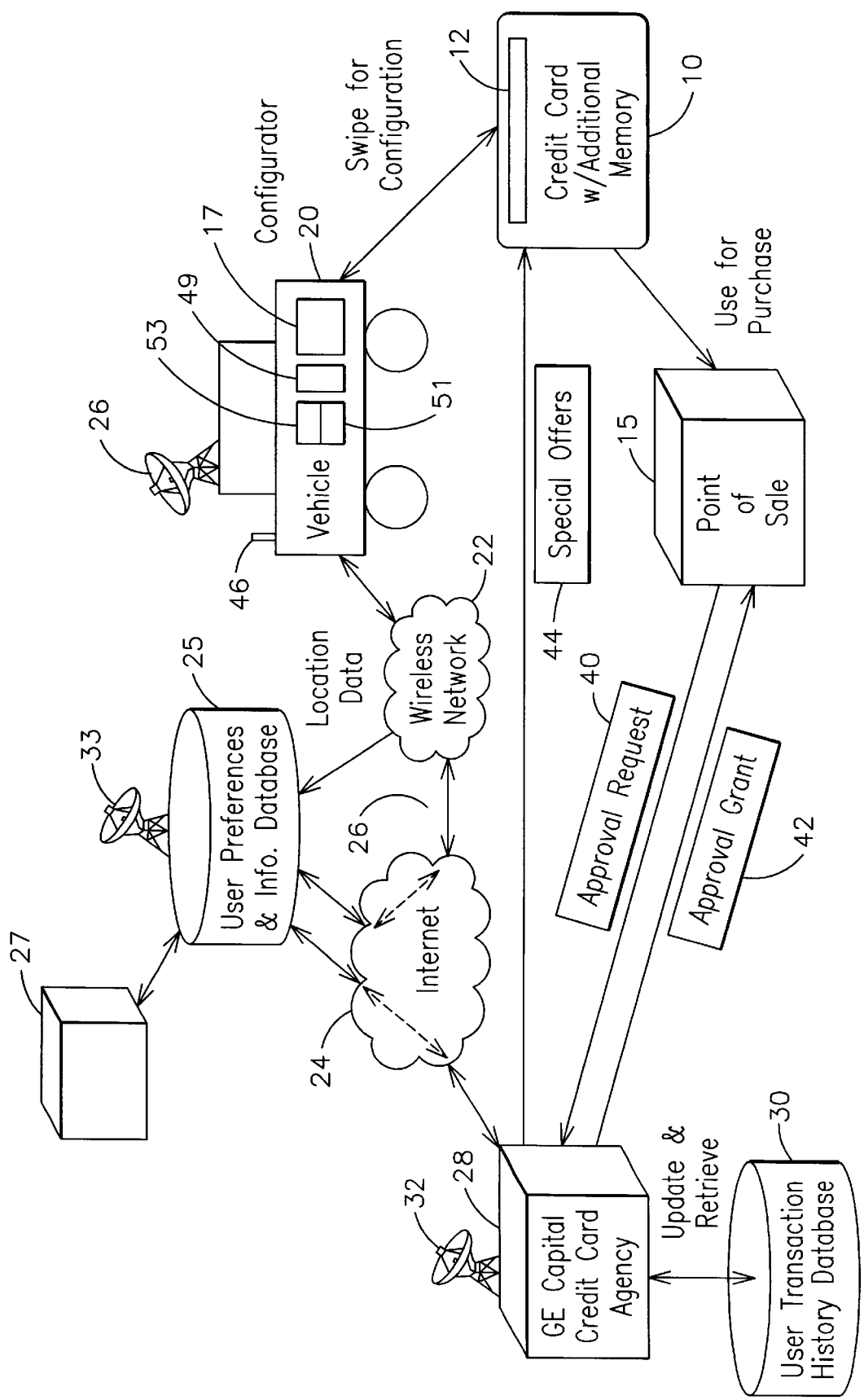
FIG. 2 is an exemplary illustration of another embodiment of communication connections between the components.

FIG. 2 is an exemplary illustration of another embodiment of communication connections between the components. The location of the vehicle 20 is determined with the use of a global positioning determination device 46, such as a global positioning receiver or network based wireless location transceiver device. Instead of transmitting a coupon 44 to the point of sale 15, based on the location of the vehicle 20, the coupon is transmitted to the vehicle 20 where the coupon 44 is viewable to the user, either by a heads up display (HUD), an on-board monitor, or a display monitor 49. The coupon 44 may be viewable either as soon as it is received or once the vehicle 20 has reached the point of sale 15. In a preferred embodiment, the user has the option to either accept or reject the coupon 44 before it is stored to the credit card 10. In another embodiment, the coupon 44 is simply stored to the credit card 10 for future use. The coupon 44 may be a coupon for use at any point of sale 15 or may be specific to a point of sale 15 near the location of the vehicle 20.

Figure 7:
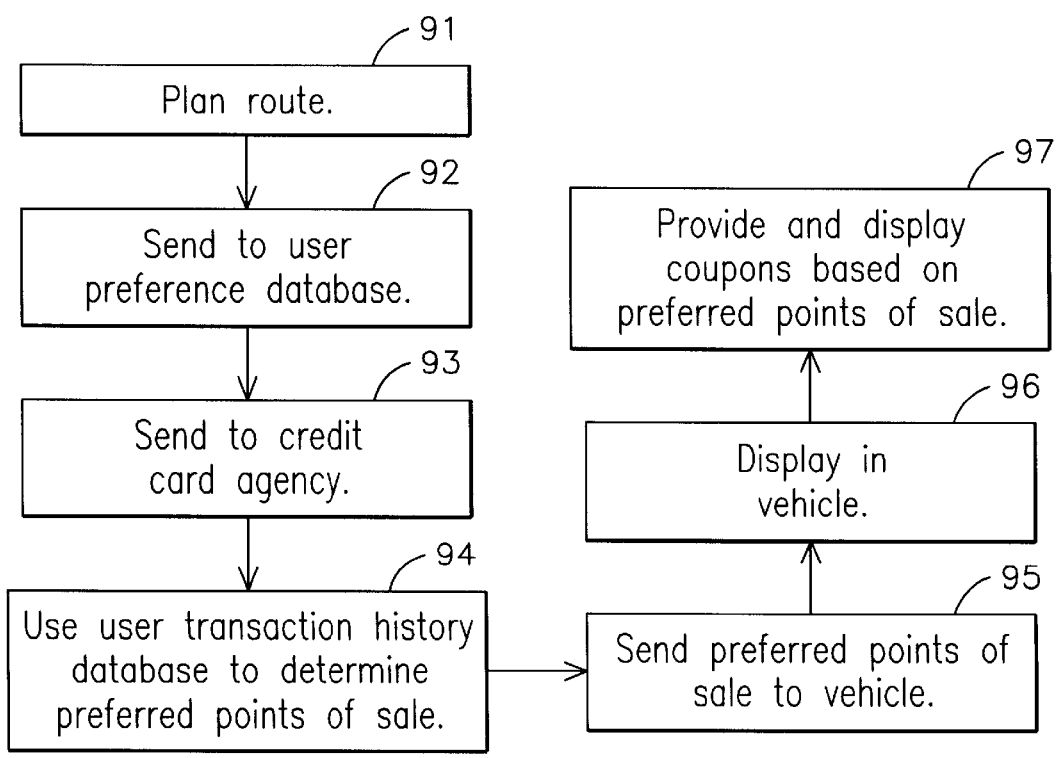
FIG. 7 is a flow chart illustrating a preferred embodiment of selecting a coupon based on a location of a vehicle.

In another preferred embodiment, illustrated in FIG. 7, the user programs a planned route 53 into a navigational aid on-board computer or processor 51, step 91. The route 53 and location of the vehicle 20 is transmitted to and stored in the User Preference Database 25, step 92. The location of the vehicle 20 and planned route 53 are transmitted to the Credit Card Agency 28, step 93. Based on the information transmitted, the Credit Card Agency 28, using the User Transaction History Database 30 reviews prior sales, determines preferred points of sale 15, such as preferred restaurants, hotels, or gas station brands, step 94. Using the User Transaction History Database 30, the Credit Card Agency 28 transfers the location of preferred points of sales 15 to the vehicle 20, step 95, for display on a display monitor 49, step 96. The information for the preferred points of sales 15 may also include coupon 44 offers, step 97.

Figure 3:
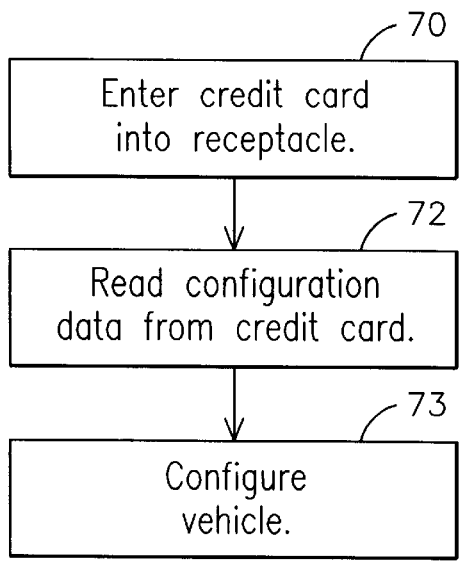
FIG. 3 is a flow chart illustrating a preferred embodiment of the invention where configuring a vehicle is accomplished with only a credit card.

FIG. 3 is a flowchart illustrating a preferred embodiment of the invention where configuring a vehicle 20 is accomplished with only a credit card 10. In this embodiment, user characteristics for a vehicle 20 are saved on the credit card 10. Thus, when a user enters the credit card 10 into the configurator or credit card receptacle 17, step 70, the configurator 17 reads the data from the card 10, step 72, and then configures the vehicle 20 based on the data retrieved, step 73. In a preferred embodiment, the receptacle 17 can also write configuration data onto the credit card 10.

Figure 4:
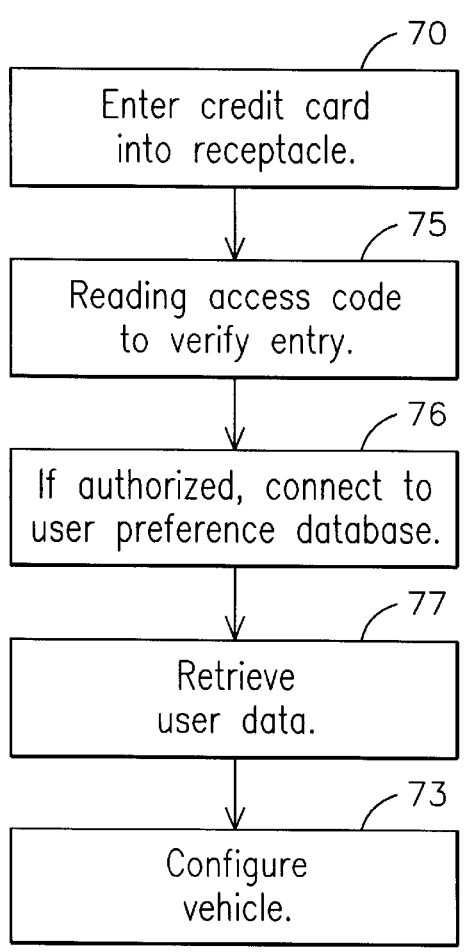
FIG. 4 is a flow chart illustrating a preferred embodiment of the invention where configuring a vehicle is accomplished with a credit card and a database.

FIG. 4 is a flow chart illustrating a preferred embodiment of the invention where configuring a vehicle 20 is accomplished with a credit card 10 and a database 25. In this embodiment, a user uses an access code for entry into the User Preferences Database 25. This access code, can include any combination of a user name, password, and vehicle identification code. Thus, when a user enters the credit card 10 into the configurator, step 70, the configurator reads the access code from the card 10, step 75, and then, if authorized connects with the User Preference Database 25 via the global communication network 19, step 76. Once access is granted to the database 25 and to the user's specifications contained in the database 25, the data is sent back to the vehicle 20, step 77, and the vehicle 20 is configured to the user's specifications, step 73.

Figure 5:
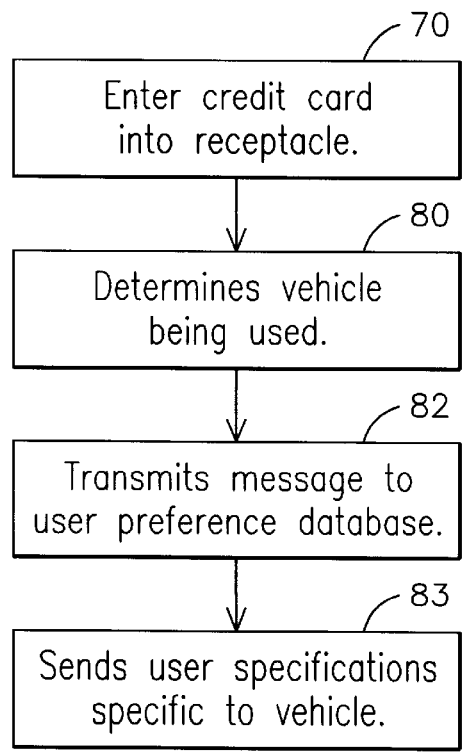
FIG. 5 is a flow chart illustrating a preferred embodiment of the invention where configuring a vehicle involves determining a type of vehicle to configure.

In another embodiment, illustrated in FIG. 5, the fleet of vehicles may be comprised of different types of vehicles. For example, a fleet of trucks may consist of truck cabs which are manufactured by different manufactures. Thus a user may have a plurality of user preferences based on the vehicles in a fleet that the user may use during a given trip. Thus when the user enters the credit card 10 in the configurator 17, step 70, the configurator 17 determines the vehicle being used, step 80 and transmits a message, including the user access code as discussed with FIG. 4, about the vehicle 20 being used to the User Preference Database 25, step 82. The User Preference Database 25 then sends back the data relevant to the given vehicle 20, step 83. In other embodiments, information about the vehicle 20 being used may be provided by other means, such as by sending a message back to the user to identify the vehicle 20 in use.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A credit card system for use by a user for conducting financial transactions and configuring features in a vehicle specific to said user, the credit card system comprising:
   a credit card with storage space capable of storing information needed for a financial transaction and information needed to configure said vehicle specific to a user of the credit card;
   a credit card data receptacle located in said vehicle.

2. The credit card system of claim 1, further comprising:
   a User Preference Database;
   a global communication network;
   respective network transceivers, for communicating over said global communication network, connected to said credit card data receptacle and connected to said User Preference Database.

3. The credit card system of claim 2 further comprising a remote facility that contains said User Preference Database.

4. The credit card system of claim 2 wherein said network transceivers are used to transmit data between said vehicle and said User Preference Database over a secured network.

5. The credit card system of claim 2 wherein said global communication network comprises a wireless data network.

6. The credit card system of claim 1 wherein said vehicle has a seat for said user and said information to configure said vehicle specific to said user comprises a seat's settings.

7. The credit card system of claim 1 wherein said vehicle has a radio and said information to configure said vehicle specific to said user comprises preferred settings for said radio.

8. The credit card system of claim 1 wherein said vehicle has a steering wheel and said information to configure said vehicle specific to said user comprises a steering wheel's settings.

9. The credit card system of claim 1 wherein said vehicle has climate control apparatus and said information to configure said vehicle specific to the user comprises a climate control's settings.

10. The credit card system of claim 1 wherein said credit card contains default user preference data in said storage space.

11. The credit card system of claim 1 wherein said credit card data receptacle is operable to store updated user specific preferences on said credit card based on preferences selected by said user.

12. A credit card system for configuring a complex equipment specific to a user and for transacting financial transactions, the system comprising:
   a User Preference Database containing information specific to said user for configuring said complex equipment;
   a credit card capable of storing financial transaction information and information to access said User Preference Database;
   a credit card data receptacle connected to said complex equipment;
   a global communication network;
   a User Transaction History Database containing information about said user's prior transactions;
   a display monitor connected to said complex equipment;
   a point of sale where said credit card is used for a financial transaction.

13. The credit card system of claim 12 wherein said User Preference Database and said User Transaction History Database are stored at a remote facility.

14. The credit card system of claim 12 wherein said User Preference Database is stored at a first remote facility, said User Transaction History Database is stored at a second remote facility, and communication occurs between said User Preference Database and said User Transaction History Database via said global communication network.

15. The credit card system of claim 12 wherein, using said display monitor, said credit card system displays a coupon to said user based on information contained in said User Transaction History Database for use at said point of sale.

16. The credit card system of claim 15 wherein said user accepts said coupon and said coupon is stored on said credit card.

17. The credit card system of claim 15 wherein said user accepts said coupon at said point of sale.

18. The credit card system of claim 12 further comprising a global positioning device connected to said complex equipment to determine a location of said complex equipment.

19. The credit card system of claim 18 wherein said complex equipment transmits said location to said User Preference Database.

20. The credit card system of claim 19 wherein said location is transmitted from said User Preference Database to said User Transaction History Database.

21. The credit card system of claim 18 wherein said location is transmitted to said User Transaction History Database wherein said coupon is selected based on said location.

22. The credit card system of claim 18 wherein said location is transmitted to said Transaction History Database wherein said coupon is selected based on a prior transaction of said user and said location.

23. The credit card system of claim 12 further comprising a computer connected to said complex equipment comprising trip routing functions.

24. The credit card system of claim 23 wherein a routed trip is transmitted to said User Preference Database.

25. The credit card system of claim 23 wherein a routed trip is transmitted to said Transaction History Database and said coupon is displayed in said complex equipment based on a prior transaction of said user and said routed trip.

26. The credit card system of claim 23 wherein a routed trip is transmitted to said Transaction History Database and a location of said point of sale is displayed in said complex equipment based on a prior transaction of said user and said routed trip.

27. A method for configuring a complex equipment specific to a user with a credit card, the method comprising:
   having a User Preference Database;
   entering a credit card into a receptacle connected to said complex equipment;
   allowing said credit card to retrieve complex equipment setting data specific to said user from said User Preference Database;

configuring said complex equipment based on said data received.

28. The method of claim 27 further comprising:

notifying said user of a coupon transmitted from said User Transaction History Database wherein said coupon is selected based on information contained in said User Transaction History Database;

saving said coupon for use at a point of sale.

29. The method of claim 27 wherein the step of notifying said user of a coupon comprises:

having a display monitor connected to said complex equipment;

having a User Transaction History Database;

displaying a coupon on said display monitor.

30. The method of claim 28 wherein the step of notifying a user of a coupon further comprises:

having a position locating device connected to said complex equipment;

determining a location of said complex equipment;

displaying a coupon based on information contained in said User Transaction History Database and said location.

31. The method of claim 28 wherein the step of saving said coupon comprises saving said coupon on said credit card.

32. The method of claim 28 wherein the step of saving said coupon comprises saving said coupon in said User Transaction History Database and transmitting to said point of sale when said credit card is used.

* * * * *